(12) United States Patent
Acevedo Arizpe et al.

(10) Patent No.: US 9,626,432 B2
(45) Date of Patent: Apr. 18, 2017

(54) DEFECT RECORD CLASSIFICATION

(71) Applicant: INTERNATIONAL BUSINESS MACHINES CORPORATION, Armonk, NY (US)

(72) Inventors: Enrique M. Acevedo Arizpe, Guadalajara (MX); Rosa N. Gutierrez Aguilar, Guadalajara (MX); Mitzi Louise Deason Ponce, Snow Hill, NC (US); Graciela Reyes Granados, Mexico (MX); Crystal F. Springer, Marietta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 365 days.

(21) Appl. No.: 14/021,774

(22) Filed: Sep. 9, 2013

(65) Prior Publication Data

US 2015/0073773 A1  Mar. 12, 2015

(51) Int. Cl.
*G06F 17/27* (2006.01)
*G06F 17/30* (2006.01)

(52) U.S. Cl.
CPC ............... *G06F 17/30705* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775

(Continued)

(56) References Cited

U.S. PATENT DOCUMENTS 6,058,393 A * 5/2000 Meier ................. G06F 11/3664
                                                    707/999.01
6,918,059 B1 * 7/2005 Galuten ............. G06F 11/0715
                                                    714/31

(Continued)

FOREIGN PATENT DOCUMENTS

KR           100980579 B1     9/2010

OTHER PUBLICATIONS

Song, Q. et al., "Software Defect Association Mining and Defect Effort Prediction", IEEE Transactions on Software Engineering, vol. 32, No. 2, Feb. 2006, pp. 69-82.

(Continued)

*Primary Examiner* — Lamont Spooner
(74) *Attorney, Agent, or Firm* — Christopher K. Mclane; Andrew M. Calderon; Roberts Mlotkowski Safran, Cole & Calderon, P.C.

(57) ABSTRACT

An approach to classify different defect records by mapping plain language phrases to a taxonomy. The approach includes a method that includes receiving, by at least one computing device, a defect record associated with a defect. The method further includes receiving, by the least one computing device, a plain language phrase or word. The method further includes mapping, by the least one computing device, the plain language phrase or word to a taxonomy. The method further includes classifying, by the least one computing device, how the defect was at least one of detected and resolved using the taxonomy.

20 Claims, 7 Drawing Sheets

(58) Field of Classification Search
USPC .................................................. 704/1, 9, 10
See application file for complete search history.

(56) References Cited

U.S. PATENT DOCUMENTS

| | | | | |
|---|---|---|---|---|
| 7,359,544 | B2* | 4/2008 | Gao | G06K 9/6253 |
| | | | | 382/145 |
| 7,548,967 | B2* | 6/2009 | Amyot | H04M 3/42153 |
| | | | | 379/15.03 |
| 7,593,927 | B2 | 9/2009 | MacLennan et al. | |
| 7,757,125 | B2 | 7/2010 | Bassin et al. | |
| 7,765,436 | B2 | 7/2010 | Bassin et al. | |
| 7,805,455 | B2 | 9/2010 | Todhunter | |
| 7,917,895 | B2* | 3/2011 | Givoni | G06F 11/3414 |
| | | | | 717/115 |
| 7,917,897 | B2 | 3/2011 | Bassin et al. | |
| 8,782,556 | B2* | 7/2014 | Badger | G06F 3/0237 |
| | | | | 715/816 |
| 8,910,120 | B2* | 12/2014 | Srinivasa | G06F 17/30 |
| | | | | 717/124 |
| 8,924,935 | B1* | 12/2014 | Chopra | G06F 8/71 |
| | | | | 717/120 |
| 9,047,414 | B1* | 6/2015 | Matyjek | G06F 11/3688 |
| 9,218,163 | B2* | 12/2015 | Dehors | G06F 8/41 |
| 2003/0144775 | A1* | 7/2003 | Klausner | B60R 16/0234 |
| | | | | 701/33.4 |
| 2004/0009161 | A1* | 1/2004 | Escary | A61K 31/00 |
| | | | | 424/94.1 |
| 2004/0078695 | A1* | 4/2004 | Bowers | G06F 11/0781 |
| | | | | 714/39 |
| 2004/0088115 | A1* | 5/2004 | Guggari | G06Q 10/06 |
| | | | | 702/13 |
| 2004/0088324 | A1* | 5/2004 | Khan | G06Q 10/00 |
| 2004/0102978 | A1* | 5/2004 | Gygi | G06F 11/3688 |
| | | | | 704/275 |
| 2005/0138602 | A1* | 6/2005 | Hinchey | G06F 8/30 |
| | | | | 717/106 |
| 2006/0235690 | A1* | 10/2006 | Tomasic | G06F 3/0481 |
| | | | | 704/257 |
| 2006/0251073 | A1* | 11/2006 | Lepel | G06F 17/303 |
| | | | | 370/392 |
| 2006/0265188 | A1* | 11/2006 | French | G06F 11/3676 |
| | | | | 702/185 |
| 2007/0014614 | A1* | 1/2007 | Yoshida | G03G 15/5016 |
| | | | | 400/62 |
| 2007/0150084 | A1* | 6/2007 | Grubb | G06Q 10/00 |
| | | | | 700/110 |
| 2007/0174023 | A1* | 7/2007 | Bassin | G06F 11/3688 |
| | | | | 702/186 |
| 2007/0174720 | A1* | 7/2007 | Kubo | G06F 11/008 |
| | | | | 714/42 |
| 2007/0232376 | A1* | 10/2007 | Krishna | A63F 13/12 |
| | | | | 463/9 |
| 2007/0237310 | A1* | 10/2007 | Schmiedlin | G06F 3/0237 |
| | | | | 379/88.01 |
| 2008/0046860 | A1* | 2/2008 | Kratschmer | G06F 11/008 |
| | | | | 717/101 |
| 2008/0052126 | A1* | 2/2008 | Sasai | G06F 17/30265 |
| | | | | 705/3 |
| 2008/0109683 | A1* | 5/2008 | Erwin | G06F 11/079 |
| | | | | 714/46 |
| 2008/0120544 | A1 | 5/2008 | Treadgold | |
| 2008/0126436 | A1* | 5/2008 | Thorn | G06F 3/0237 |
| 2008/0126880 | A1* | 5/2008 | Hegarty | G06F 11/3684 |
| | | | | 714/46 |
| 2008/0127095 | A1* | 5/2008 | Brennan | G06F 11/3664 |
| | | | | 717/124 |
| 2008/0141076 | A1* | 6/2008 | Hu | G06F 11/0733 |
| | | | | 714/45 |
| 2008/0208567 | A1* | 8/2008 | Brockett | G06F 17/274 |
| | | | | 704/9 |
| 2008/0222068 | A1* | 9/2008 | Bahl | G06N 5/043 |
| | | | | 706/46 |
| 2009/0139542 | A1* | 6/2009 | Furukawa | H01L 21/67288 |
| | | | | 134/1.3 |
| 2009/0210504 | A1* | 8/2009 | Shuster | H04L 51/28 |
| | | | | 709/206 |
| 2010/0017787 | A1* | 1/2010 | Bellucci | G06F 11/366 |
| | | | | 717/111 |
| 2010/0114609 | A1* | 5/2010 | Duffy, Jr. | G06Q 50/24 |
| | | | | 705/3 |
| 2010/0179804 | A1* | 7/2010 | Dargelas | G06F 17/2854 |
| | | | | 704/9 |
| 2010/0191731 | A1* | 7/2010 | Rus | G06Q 10/10 |
| | | | | 707/737 |
| 2010/0235810 | A1* | 9/2010 | Campbell | G06F 11/362 |
| | | | | 717/106 |
| 2010/0241380 | A1* | 9/2010 | Cookson | G06T 7/0004 |
| | | | | 702/84 |
| 2010/0312549 | A1* | 12/2010 | Akuwudike | G06F 17/276 |
| | | | | 704/9 |
| 2011/0022941 | A1 | 1/2011 | Osborne et al. | |
| 2011/0054925 | A1* | 3/2011 | Ghani | G06Q 40/08 |
| | | | | 705/2 |
| 2011/0066557 | A1* | 3/2011 | Bassin | G06F 11/3616 |
| | | | | 705/301 |
| 2011/0066890 | A1* | 3/2011 | Bassin | G06F 11/3672 |
| | | | | 714/37 |
| 2011/0067005 | A1* | 3/2011 | Bassin | G06F 11/008 |
| | | | | 717/127 |
| 2011/0067006 | A1* | 3/2011 | Baker | G06F 9/44589 |
| | | | | 717/127 |
| 2011/0246540 | A1* | 10/2011 | Salman | G06F 11/3672 |
| | | | | 707/812 |
| 2011/0246969 | A1* | 10/2011 | Lee | G06F 11/362 |
| | | | | 717/125 |
| 2011/0276944 | A1* | 11/2011 | Bergman | G06F 11/3684 |
| | | | | 717/124 |
| 2012/0053984 | A1* | 3/2012 | Mannar | G06Q 50/06 |
| | | | | 705/7.28 |
| 2012/0057773 | A1* | 3/2012 | Langmatz | G06T 7/001 |
| | | | | 382/141 |
| 2012/0117095 | A1* | 5/2012 | Chavvakula | H04L 12/2697 |
| | | | | 707/758 |
| 2012/0226645 | A1* | 9/2012 | O'Rourke | G06Q 40/06 |
| | | | | 706/46 |
| 2012/0246620 | A1 | 9/2012 | Bellucci et al. | |
| 2012/0303356 | A1 | 11/2012 | Boyle et al. | |
| 2013/0097586 | A1* | 4/2013 | Chandra | G06F 11/3684 |
| | | | | 717/124 |
| 2013/0140457 | A1* | 6/2013 | Minekawa | G06T 7/0004 |
| | | | | 250/307 |
| 2013/0262082 | A1* | 10/2013 | McKeeman | G06F 17/27 |
| | | | | 704/9 |
| 2013/0268260 | A1* | 10/2013 | Lundberg | G06F 17/28 |
| | | | | 704/8 |
| 2014/0061305 | A1* | 3/2014 | Nahill | G06K 7/0095 |
| | | | | 235/438 |
| 2014/0100923 | A1* | 4/2014 | Strezo | G06Q 10/067 |
| | | | | 705/7.39 |
| 2014/0195396 | A1* | 7/2014 | Bhakta | G06Q 40/02 |
| | | | | 705/35 |
| 2014/0380280 | A1* | 12/2014 | Millwood | G06F 11/366 |
| | | | | 717/127 |

OTHER PUBLICATIONS

Xie, T. et al., "Mining Software Engineering Data", 29th International Conference on Software Engineering—Companion 2007, ICSE 2007, May 20, 2007 to May 26, 2007, pp. 172-173.

\* cited by examiner

| DRM value for taxonomy element Activity | CDM-DRM plain language phrase |
|---|---|
| Requirements Review | reviewing requirements documents |
| Design Review | reviewing design documents / specifications |
| Code Inspection | reviewing source code |
| Unit Test | performing whitebox, developer-level tests |
| Function Test | executing blackbox testing to verify the functional capability of the system, which can include integration of multiple components |
| System Test | executing blackbox testing to verify capability of the full system under very specific conditions |
| Performance/Scalability | performing performance and scalability tests |
| Information Development Review | reviewing internal / customer documentation or help text |
| GUI Review | reviewing presentation (but not functional) aspects of the user interface |
| Configuration Validation | reviewing configuration of the system, environment (including databases, middleware, etc.) |

FIG. 2

DEFECT RECORD CLASSIFICATION

FIELD OF THE INVENTION

The present invention generally relates to classification management, and more particularly, to a method and system for mapping plain language phrases to a taxonomy for classifying different defect records associated with an application.

BACKGROUND

During the development of an application (e.g., an accounting application written in SAP for a particular corporation, a marketing application, etc.), various types of analysis tools are available for determining whether any defects exist within the application. The analysis tools may be used to analyze various aspects of the application. For example, the analysis tools can be used to analyze source code, functionality, performance, scalability, user interfaces, and/or any other aspect of the application. Not only can analysis tools detect and resolve the defects, information about how the defect was detected and resolved can be stored in defect records. The defect records can then be classified according to the type of defect and also other factors, such as how the defect was resolved. One particular type of methodology of classification uses defect reduction method (DRM) taxonomy which is based on orthogonal defect classification. Although DRM taxonomy is a very powerful tool, it can be time consuming to learn and understand.

SUMMARY

In a first aspect of the invention, a method includes receiving, by at least one computing device, a defect record associated with a defect. The method further includes receiving, by the least one computing device, a plain language phrase or word. The method further includes mapping, by the least one computing device, the plain language phrase or word to a taxonomy. The method further includes classifying, by the least one computing device, how the defect was at least one of detected and resolved using the taxonomy.

In another aspect of the invention, there is a computer program product for classifying defect records. The computer program product includes a computer usable storage medium having program code embodied in the storage medium. The program code is readable/executable by a computing device operable to receive a defect record. The computer program product includes sending the defect record to a user. The computer program product includes receiving a first plain language phrase or word related to how a defect associated with the defect record was discovered. The computer program product includes receiving a second plain language phrase or word related to how the defect associated with the defect record was resolved. The computer program product includes mapping the first plain language phrase or word to a taxonomy. The computer program product includes mapping the second plain language phrase or word to the taxonomy. The computer program product includes initiating to send the defect record with the taxonomy.

In a further aspect of the invention, there is a computer system for classifying defect records. The system includes a CPU, a computer readable memory and a computer readable storage medium. Program instructions provide a defect record to a user. Program instructions provide a recommendation of a plain language phrase or word to classify the defect record. Program instructions generate the defect record with the recommended plain language phrase or word. Program instructions send the defect record with the plain language phrase or word to a translation tool which generates taxonomy that is used by another user to analyze the defect record. The program instructions are stored on the computer readable storage medium for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIG. 2 shows an exemplary mapping database used to map DRM taxonomy elements to particular terminology in accordance with aspects of the invention.

DETAILED DESCRIPTION

Figure 1:
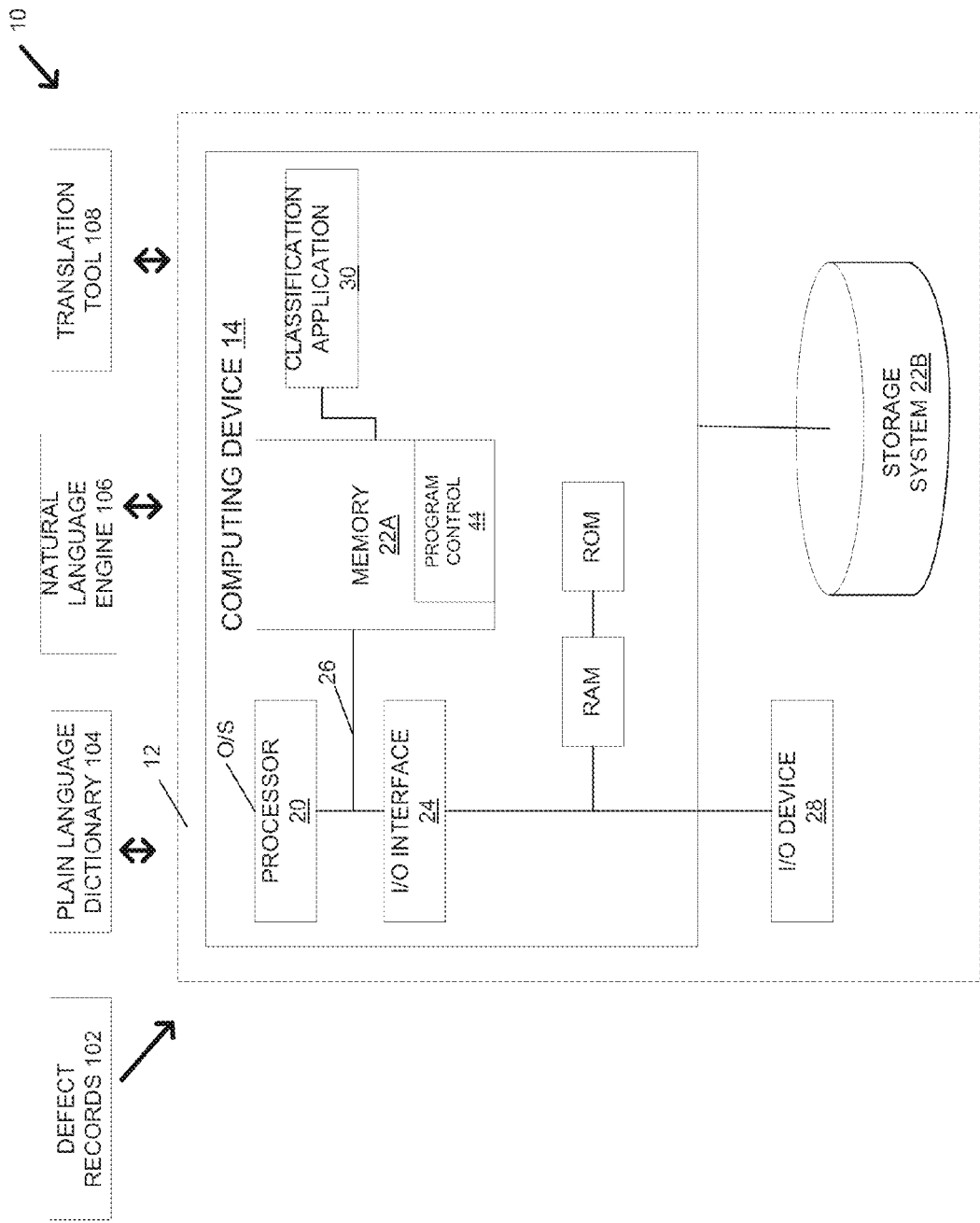
FIG. 1 is an illustrative environment for implementing the steps in accordance with aspects of the invention.

The present invention generally relates to defect management, and more particularly, to a method and system for mapping plain language phrases to a taxonomy for classifying different defect records. In embodiments, the present invention provides a user interface associated with a classification application that allows a user, who may not be trained in defect reduction method (DRM) taxonomy, to classify defect records by using plain language words or phrases associated with any language (e.g., English, French, Japanese, Hindi, etc.). In embodiments, the user can also use other types of phrases that can be a mix of different languages (e.g., a mix of English and Spanish) or the phrases can use slang, or any other type of language. The user selected plain language phrases are then mapped to DRM taxonomy.

Advantageously, the present invention allows plain language phrases to be mapped to DRM taxonomy. This ensures that users who are not trained in certain taxonomies can still implement and use the analysis tool, e.g., DRM. This is done with the use of a tool of the present invention that can translate plain language syntax into taxonomy of an analysis tool. The present invention also provides a plain language interface, associated with a classification tool, to classify defect records. In embodiments, the use of the plain language increases the level of analysis of the defect records, as well as increases the level of accuracy of the classification process. The present invention also provides more accurate resolution information and enables real time categorization of the defect record, regardless of where the users are located. It should be understood that the present invention can be implemented with any defect management/analysis/ reduction tool, including any known DRM tool. Accordingly, although the description focuses on a DRM taxonomy, the present invention is applicable to any taxonomy.

In further embodiments, the present invention can use a predictive analysis tool to provide recommendations on plain language words/phrases to users, which can then be mapped to the DRM taxonomy. The present invention may provide recommendations for any particular plain language words/phrases when the words/phrases are used beyond a particular threshold (e.g., a threshold associated with a particular quantity within a time period). Further, recommendations for any particular plain language words/phrases may also follow an approval process initiated by a user of the invention.

In embodiments, the present invention generates a classification of two different portions of a defect record. One portion of the defect record that is classified is defined as the problem description portion which includes a description of a test or condition that was used to detect the defect. The other portion of the defect record that is classified is defined as the resolution description which defines what is necessary to resolve the defect, a level of complexity associated with resolving the defect, and whether the resolution includes adding, removing, and/or correcting elements of the system being tested. Accordingly, the present invention classifies a defect record that includes classifying how defects are found and how the defects are resolved by providing one or more plain language sentences.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium and/or device (hereinafter referred to as computer readable storage medium). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, environment 10 includes a server 12 or other computing system, defect records 102, plain language dictionary 104, natural language engine 106, and translation tool 108.

Defect records, 102, plain language dictionary 104, natural language engine 106, and translation tool 108 can be stored on one or more computing devices that can send/receive information between each other and to computing device 14 by using machine to machine interfaces, such as an application programming interface (API). The machine to machine interfaces can in embodiments: (i) push plain language phrase taxonomy updates to computing device 14; (ii) push gate logic to the client tool; (iii) provide bidirectional transfer of defect record data; (iv) provide bidirectional transfer of classifications; (v) enable predictive text analytics in computing device 14; and (vi) enable collaboration between different users, via different communication systems.

Computing device 14 can be resident on a network infrastructure or computing device of a third party service provider (any of which is generally represented in FIG. 1). Computing device 14 can be resident on a network infrastructure or computing device of a third party service provider (any of which is generally represented in FIG. 1).

Computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

Computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls a classification application 30, e.g., the processes described herein. Classification application 30 can be implemented as one or more program code in program control 44 stored in memory 22A as separate or combined modules. Additionally, classification application 30 may be implemented as separate dedicated processors or a single or several processors to provide the function of these tools.

While executing the computer program code, the processor 20 can read and/or write data to/from memory 22A, storage system 22B, and/or I/O interface 24. The program code executes the processes of the invention. The bus 26 provides a communications link between each of the components in computing device 14.

In embodiments, defect records 102 are generated when a defect occurs within any particular application. The particular application can be written in any type of language (e.g., SAP, Oracle, C++, Java, etc.) that is being used for any particular functionality (e.g., such as engineering, scientific, administrative, legal, financial, etc.). Defect records 102 can be associated with records that include information regarding the type of defect and the resolution to the defect. Each one of defect records 102 contains multiple fields of information that include: (i) a unique defect record identifier; (ii) a record open date; (iii) a record close date; (iv) problem description which describes how the defect was discovered and steps to recreate the defect; and (v) resolution description which describes the resolution/disposition of the defect. Defect records 102 can be imported into computing device 14 using a pre-defined import procedure that imports defect records 102 and assigns specific fields to each defect record 102. The specific fields can include plain language phrases for activity, trigger, target, artifact type, artifact qualifier, impact, source, content, and/or age. Additional fields can also be added, such as fields associated with work flow management.

Using classification application 30, a user, using a user interface, can access one or more defect records 102 and determine the type of testing or defect removal activity that revealed the defect. For example, using classification application 30 the user can select or enter a plain language phrase from plain language dictionary 104 (which is accessible via the user interface) to describe the type of testing and/or defect removal activity. Plain language dictionary 104 can store words and phrases that can be selected by a user to map a particular word/phrase for a particular defect record 102. For example, plain language dictionary 104 can store phrases such as "reviewing requirement documents," "reviewing source code," "executing performance and scalability tests," and/or other phrases. In embodiments, the user interface for the classification application 30 may provide a list of plain language phrases from plain language dictionary 104 that describe the complexity of the activity or any special conditions that existed in order for the defect to be determined. Additionally, or alternatively, the user interface will allow the user to enter any natural language phrase or word which can describe the activity or any special conditions. These newly entered words or phrases can be stored by plain language dictionary 104.

Once the user has selected or entered a plain language phrase that determines the type of testing or defect removal activity that revealed the defect, natural language engine 106 can map the selected plain language phrase to the DRM taxonomy associated with how the defect was determined or resolved. In embodiments, natural language engine 106 can be used to map the natural language words/phrases selected or entered by the user to any type of taxonomy. For example, natural language engine 106 can store a mapping database that matches different natural language words/phrases to DRM taxonomy.

In embodiments, the user can enter a particular plain language phrase. If not provided in plain language dictionary 104, plain language dictionary 104 and/or natural language engine 106 can look for synonyms that would provide a description of the defect record. For example, the user may enter "mistake," which is not provided in plain language dictionary 104. Plain language dictionary 104 can then perform a synonym search and find "error." The user can then be provided an opportunity to select "error;" and thus use that term instead of the user entered term. The synonyms can be stored in a dictionary such as plain language dictionary 104.

In embodiments, the user can select one or more plain language phrases from plain language dictionary 104 that are used to describe a resolution that was implemented to resolve the defect or how the defect was discovered. Based on the plain language phrase used to describe the type of testing or defect removal activity, classification application 30 can provide a list of plain language phrases that describe the resolution by including the scope of the resolution and the modality of the resolution (e.g., adding, removing, correcting, restarting, etc.). The user interface can also provide connecting words that bind multiple phrases into a single plain language sentence to describe the resolution of the defect or how the defect was discovered. The plain language phrase selected by the user is then mapped to the DRM taxonomy by natural language engine 106.

In embodiments, natural language engine 106 can include a predictive text analytics application which recommends to a user, using computing device 14, a particular word/phrase to classify how the defect was discovered and/or resolved. The suggested words/phrases can be presented to the user via the user interface. By way of example, natural language engine 106 can provide recommendations based on how many times (e.g., within a time period) a plain language phrase has previously been selected or used. Alternatively, natural language engine 106 can provide recommendations or predict taxonomies based on a user providing instructions to natural language engine 106 regarding phrases for particular types of DRM taxonomy.

The defect record along with the selected or entered plain language phrase (which has been mapped) is sent to translation tool 108. Translation tool 108 can translate the plain language phrase to DRM taxonomy, which is then sent with the defect record to another computing device being used by another user (e.g., an analyst). The analyst can then analyze the defect record using the DRM taxonomy. Accordingly, an untrained individual, i.e., the classifier, in DRM taxonomy can classify the defect record and a trained individual, i.e., the analyst, can use DRM taxonomy to analyze the defect record.

In embodiments, workflow management can allow multiple computing devices 14 to access defect records 102. This also allows for a variety of users (e.g., classifiers) to provide concurrent validation of classification selections, which provides a level of quality assurance. For example, one group of users/classifiers can use a data table view, displayed via the user interface, that show mapped plain language phrases to DRM taxonomy; whereas, another group of users/classifiers can view only the plain language phrases. This allows for different levels of access for different users.

The workflow management also allows for communications (e.g., messaging, VoIP, text, email, etc.) between different users and the sharing of defect record classification information in real time. This allows for the creation of an audit trail of classification choices and collaboration. The communication between different users can also be automatically translated into different plain languages (e.g., from English to Hindi, French to German, etc.).

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

FIG. 2 shows an exemplary mapping database 200 used to map DRM taxonomy elements to particular terminology. Mapping database 200 can be stored within natural language engine 106, which can use mapping database 200 to map a particular taxonomy with a plain language selected or entered by a user.

Specifically, FIG. 2 shows an activity field 202 and a plain language field 204. In embodiments, activity field 202 can be used to define a type of defect removal activity associated with a particular defect. For example, activity field 202 can be associated with DRM taxonomy that defines activities such as requirements review, design review, code inspection, unit test, function test, system test, performance/scalability, information development review, graphical user interface (GUI) review, configuration validation, and/or any other type of activity. As should be understood by those of skill in the art, other activities and taxonomies are contemplated by the present invention. Further, the listed plain language phrases are not exhaustive, nor are the plain language phrases limited to the English language. For example, the plain language phrases can be modified to reflect local languages and local technical terminology.

Plain language field 204 shows a plain language word/phrase that is mapped to a type of activity defined in activity field 202. Plain language field 204 can receive plain language words/phrases selected or entered by a user using a plain language dictionary that is associated with a classification application. In embodiments, plain language field 204 can be mapped to the taxonomies in activity field 202 by an administrator. In addition, or alternate embodiments, mapping database 200 can use predictive analysis, historical information, or other analysis tools to map newly entered plain language phrases to existing taxonomies in activity field 202.

Figure 3:
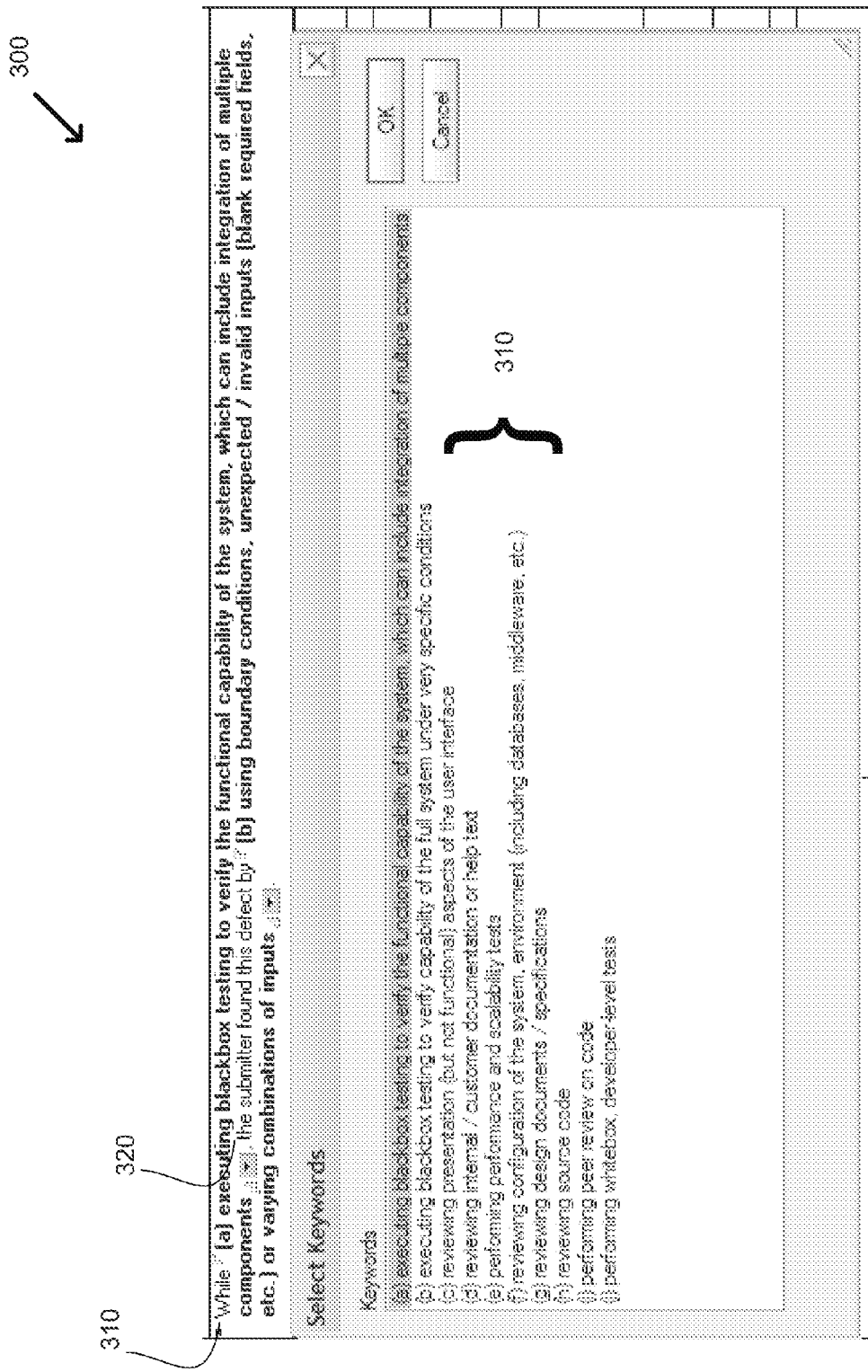
FIG. 3 shows an exemplary screen shot of a user interface, associated with a DRM application, used to classify defect records in accordance with aspects of the invention.

FIG. 3 shows an exemplary screen shot of a user interface, associated with a DRM application, used to classify defect records. As shown in FIG. 3, a user interface (e.g., a GUI interface) 300 associated with a classification application allows a user to select predefined or learned plain language phrases 310 for DRM taxonomy elements such as activity. Each of the plain language phrases 310 can be mapped uniquely to DRM values for a taxonomy element so that the user (e.g., a classifier) of the DRM application does not have to be trained in DRM taxonomy. At a minimum, the user may have testing domain knowledge.

By way of example, as shown in FIG. 3, plain language phrase 310 includes "performing whitebox, developer-level tests" (e.g., the definition of a DRM value for a unit test) and "reviewing source code" (e.g., definition of the DRM value of code inspection. As further shown in FIG. 3, the user interface allows the user to select the phrases using a mouse click or other selection method (e.g., using a keyboard) which can be combined into plain language sentences using a connector word or phrase 320. For example, connector words or phrases 320 can include "While" and "the submitter found this defect by", to combine the activity phrase and the trigger phrase to form a plain language sentence. These connector words or phrases 320 can be auto-generated or provided in a pull down menu. Once the plain language sentence is completed, the present invention can then map these phrases to a certain taxonomy. This ensures that the user does not have to memorize or even be aware of the DRM taxonomy elements, values, and definitions.

Figure 4:
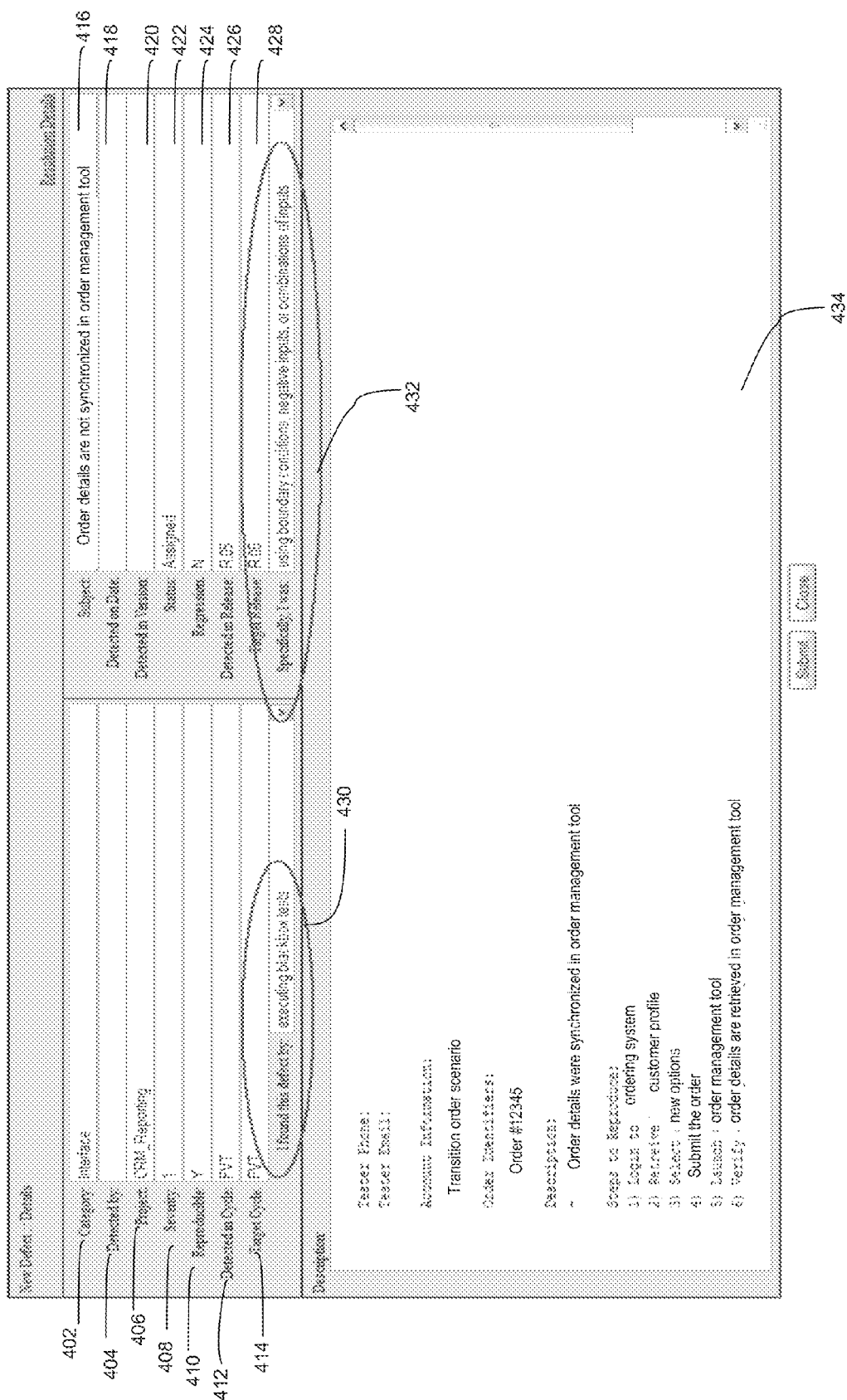
FIG. 4 shows an exemplary screen shot of a user interface used to predict plain language commands to classify defect records in accordance with aspects of the invention.

FIG. 4 shows an exemplary screen shot of a user interface used to predict plain language phrases to classify defect records. FIG. 4 can be implemented by a natural language engine that has predictive text analytical features which can suggest natural language phrases based on text as it is being entered by a user or by information in the defect record.

More specifically, FIG. 4 shows several fields: "category field 402"; "detected by field 404"; "project field 406"; "severity field 408"; "reproducible field 410"; "detected in cycle field 412"; "target cycle field 414"; "subject field 416"; "detected on date field 418"; "detected in version field 420"; "status field 422"; "regression field 424"; "detected in release 426"; "target release 428"; "phrase field 430"; "phrase field 432"; and "description box 434."

Category field 402 defines the particular element (e.g., the interface of an application) which is associated with the defect record. Detected by field 404 defines the user of the classification application. Project field 406 defines a user defined name for the defect record. Severity field 408 defines the level of impact of the defect record to the development of the application being analyzed. Reproducible field 410 defines whether the defect record can be reproduced and/or recorded. Detected in cycle field 412 and target cycle field 414 define when the defect was determined within the development cycle of the application. Subject field 416 can be a title provided for the defect record. Detected on date field 418 defines a date of the defect record. Detected in version field 420 defines a version of the application that has the defect record. Status field 422 defines whether the defect record has been assigned to a particular classifier and/or whether the defect record is still actively being analyzed. Regression field 424 defines any regression tools being used to determine the defect record. Detected in release field 426 defines the particular release of a system associated with the application being analyzed. Target release 428 defines the particular target release of the system associated with the application being analyzed.

In accordance with aspects of the invention, phrase field 430 provides the user with a field to enter plain language phrases. In embodiments, the user can enter the plain language in a free-style form which is less structured than the embodiment shown in FIG. 2. This can be a narrative form, which describes a phrase. The present invention can also implement predictive analysis tools to assist the user in completing the narrative, or a pull down menu can be provided which allows the user to select from several matches or close matches of the narrative, e.g., plain language phrases. Thus, the plain language phrases can be provided via a drop down menu or can automatically fill the field based on words/phrases previously inputted by a user. For example, phrase field 430 can be associated with "I found this defect by" with the rest of the phrase being predicted within the field and then recommended to the user.

Similarly, phrase field 432 can include plain language phrases that are predicted to be associated with the defect records. The predicted plain language phrases can be provided via a drop down menu or can automatically fill the field based on predicting words/phrases based on inputs by a user. For example, phrase field 432 can be associated with "Specifically, I was" with the rest of the phrase being predicted by a prediction analysis tool and providing a recommendation within the field to the user.

Description box 434 defines information about the nature of the defect that was found, including the expected results of the test, the actual results of the test, the steps required to reproduce the defect and other subject matter information regarding the defect. Further, description box 434 includes information regarding the account and the user, such as phone number, email, and other information.

Figure 5:
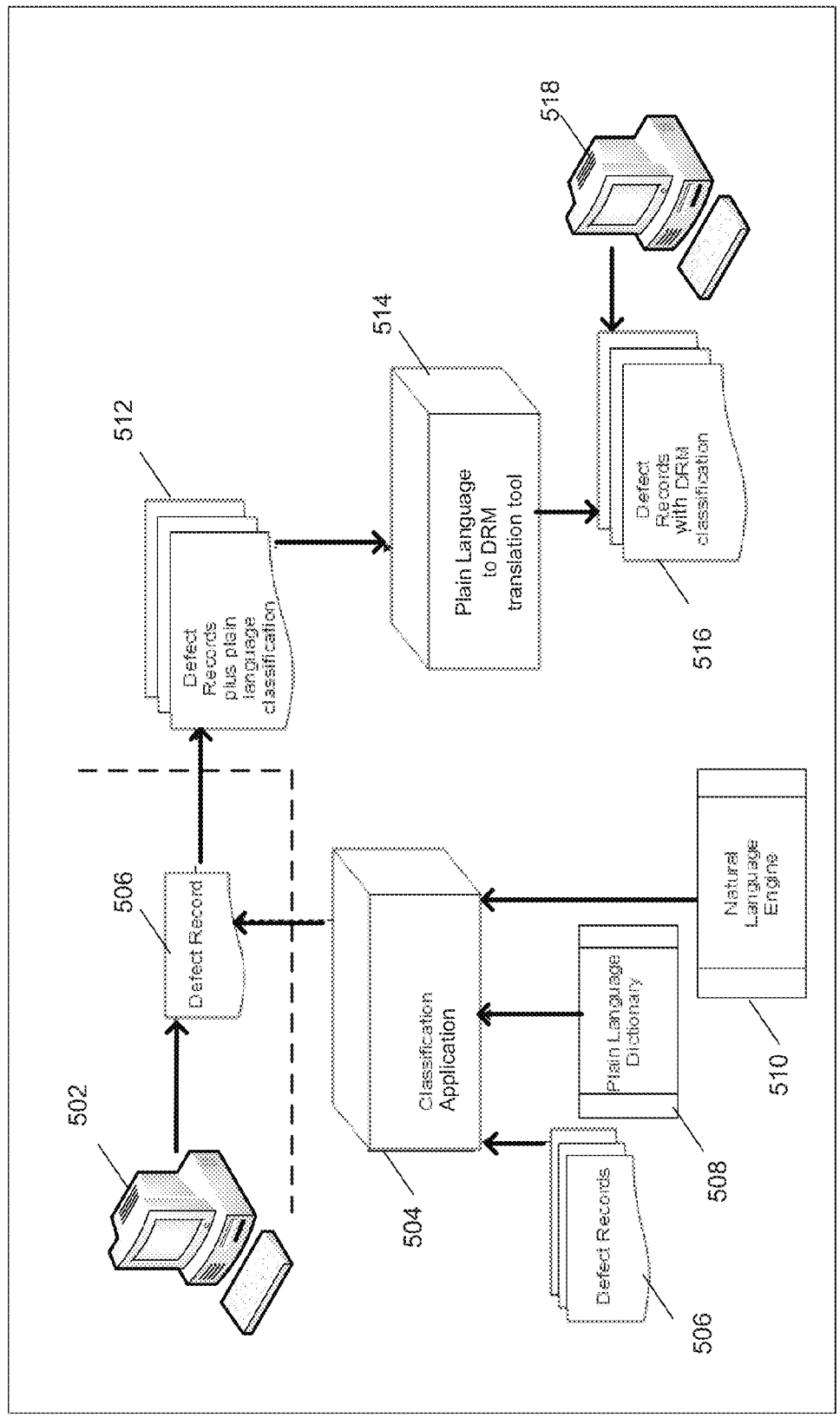
FIGS. 5-6 show functional block diagrams of environments for generating plain language phrases to classify defect records in accordance with aspects of the invention.

FIG. 5 shows a functional block diagram of an environment for implementing aspects of the present invention. In particular, FIG. 5 shows classifier computing device 502, classification application 504, defect records 506, plain language dictionary 508, natural language engine 510, defect record with plain language 512, plain language to DRM translation tool 514, defect record with DRM classification 516, and analyst computing device 518. In embodiments, classifier computing device 502, classification application 504, and defect records 506, are accessible by a user of classifier computing device 502; whereas: plain language dictionary 508, natural language engine 510, defect records with plain language 512, plain language to DRM translation tool 514, and defect record with DRM classification 516 are part of a back-end system accessible by an administrator, e.g., analyst. In embodiments, these systems are not accessible or transparent to the user of classifier computing device 502.

In embodiments, classification application 504, plain language dictionary 508, and natural language engine 510 can be part of the same computing device or each can be located on separate computing devices. Classification application 504 can be stored by classifier computing device 502 or can be stored on a separate computing device that is in communication with classifier computing device 502. In embodiments, classifier computing device 502 can be any computing device, such as a laptop, workstation, desktop computer, mobile computing device, or any other type of computing device with a display screen that can display a user interface (e.g., a graphical user interface). Classifier computing device 502 can be used by a user who classifies defect records using plain language words/phrases.

Classification application 504 is an application that can be used by the user of classifier computing device 502 to classify the defect records using plain language words/phrases. Classification application 504 can include a user interface (provided to classifier computing device 502) that allows a user to classify defect records using plain language phrases. The plain language phrases can be selected from plain language dictionary 508 which can be accessed by the user via classification application 504 on classifier computing device 502. Classification application 504 can use natural language engine 510 to map the selected plain language phrase to DRM taxonomy.

Defect records 506 can be one or more defect records. Each defect record 506 includes a defect record identifier, a record open date, the record close date, problem description (how the defect was discovered), and resolution description (how the defect was resolved). The defect record is provided to the user by way of classification tool 504 and classifier computing device 502.

Plain language dictionary 508 can be an application stored on classifier computing device 502 or stored on another computing device that communicates with classifier computing device 502. In either scenario, the user of classifier computing device 502 is not aware of plain language dictionary 508. In embodiments, plain language dictionary 508 can include one or more words and/or phrases of any desired language (e.g., English). The user of classifier computing device 502 can access plain language dictionary 508 via a user interface (displayed by classifier computing device 502) in order to select words/phrases for classifying defect records 506.

Natural language engine 510 maps words/phrases to DRM taxonomy. For example, natural language engine 510 can have a database that maps a plain language phrase (selected by a user) to a particular type of DRM taxonomy element (e.g., such as activity). Natural language engine 510 can be stored by classifier computing device 502 or can be stored on a separate computing device that communicates with classifier computing device 502. Similar to plain language dictionary 508, the user of classifier computing device 502 is not aware of natural language engine 510. In embodiments, defect record with plain language classification 512 is a user classified defect record.

Plain language to DRM translation tool 514 is an application that translates defect record with plain language 512 to a defect record with DRM classification 516. In embodiments, plain language to DRM translation tool 514 can be stored on a separate computing device than classifier computing device 502. Defect record with DRM classification 516 is a defect record that includes DRM classification such as DRM taxonomy. Analyst computing device 518 is a computing device used by another user, e.g., an analyst, to analyze defect record with DRM classification 516.

Figure 6:
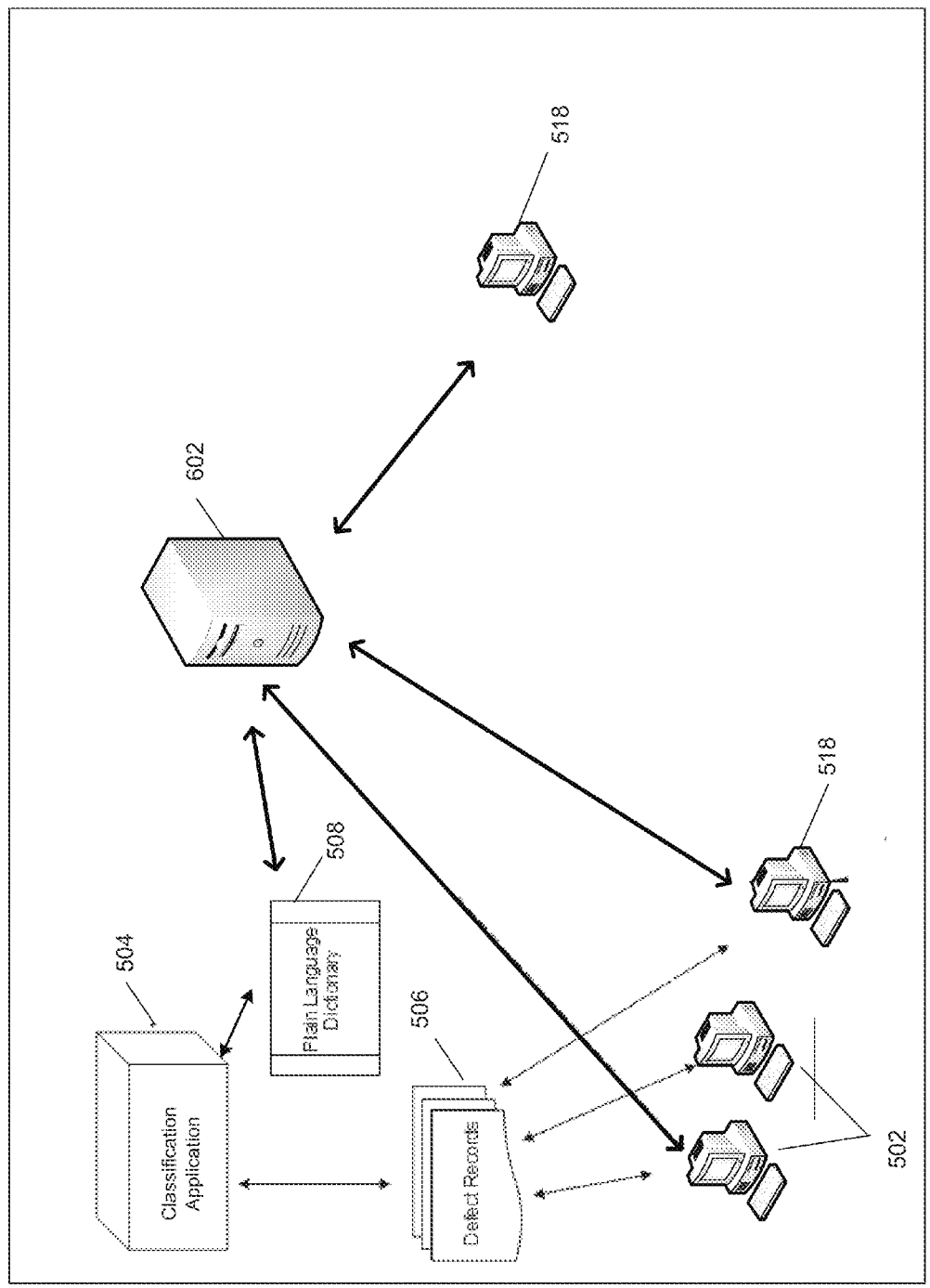

FIG. 6 shows a functional block diagram of an environment for generating plain language phrases to classify defect records. Specifically, FIG. 6 shows classifier computing devices 502, classification tool 504, defect records 506, plain language dictionary 508, analyst computing device 518, and computing device 602. While plain language dictionary 508 is shown as being separate from computing device 602, the capabilities of plain language dictionary 508 can be stored by computing device 602. Classifier computing devices 502 can use classification tool 504 to interact with computing device 602 to create and map plain language phrases to defect records 506. Analyst computing device 518 can interact with computing device 602 to analyze defect records 502.

Computing device 602 can be one or more computing devices (e.g., a server) that store one or more applications that: (i) generates a user interface so that a user can classify defect records; (ii) uses a plain language dictionary to provide a list of plain language phrases or a predictive tool to recommend plain language phrases to the user; (iii) receives plain language phrases from a user using classifier computing device 502; (iv) maps the plain language phrases to DRM taxonomy using a natural language engine stored by computing device 602; (v) provides charts and graphs regarding different trends associated with defect records; (vi) translates plain language phrases to DRM taxonomy and sends defect records with the DRM taxonomy to analyst computing device 518; and (vii) provides communication (e.g., email, text messaging, instant messaging, etc.) capabilities between classifier computing devices 502 and analyst computing device 518.

In using a central computing system, such as computing device 602, the classification application, via the user interface, provides plain language fields with drop-down choices and logic to gate choices. Thus, computing device 602 can push updates to the classification application to maintain plain language phrase taxonomy elements in synch with the standardized plain language phrase taxonomy. These updates can include new or revised plain language phrase translations in languages such as English, Hindi, or French.

While the user of classifier computing device 502 can use the modules and applications stored by computing device 602 to select plain language phrases to classify defect records, the user is not able to view the DRM taxonomy stored by computing device 602. However, analyst computing device 518 can access defect records with DRM taxonomy and also other applications stored by computing device 602.

Flow Diagram

Figure 7:
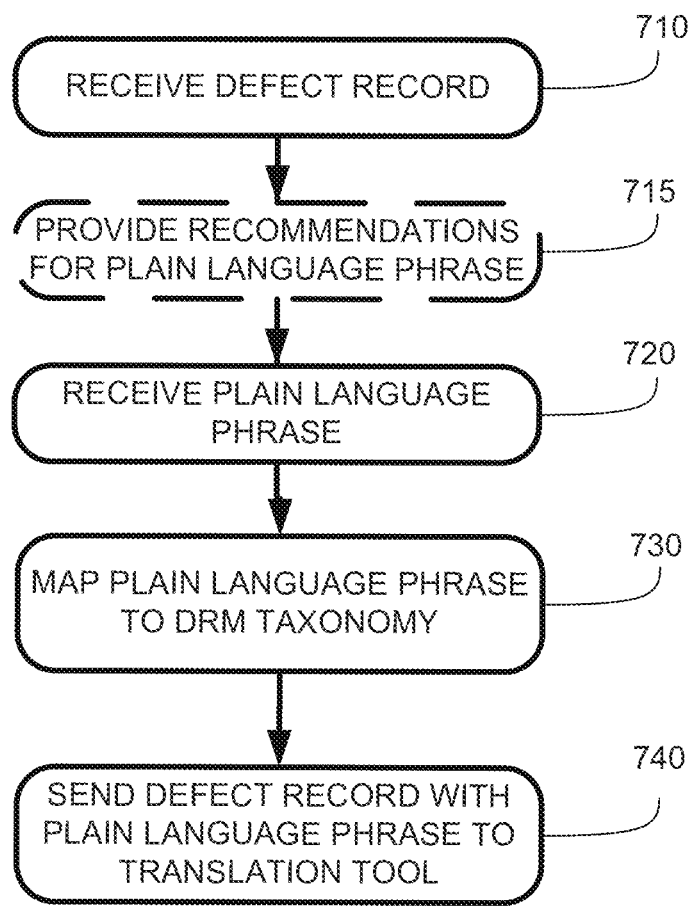
FIG. 7 shows an exemplary flow in accordance with aspects of the invention.

FIG. 7 shows an exemplary flow for performing aspects of the present invention. The steps of FIG. 7 may be implemented in the environment of FIGS. 1, 5 and 6 for example. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

At step 710, a classification application receives a defect record. At optional step 715, the classification application can provide recommendations on plain language phrases to a user based on information within the defect record. At step 720, the classification application receives one or more plain language phrases to classify the defect record. The plain language phrases can be provided by a user of a computing device as already discussed herein. At step 730, the classification application maps the plain language phrases to the DRM taxonomy associated with the defect record. The natural language phrases can be associated with DRM taxonomy for activity, trigger, target, artificial type, artificial qualifier, impact, source, content, and/or age, amongst other items and/or functions. The classification application can use a natural language engine to map the plain language phrase to DRM taxonomy.

At step 740, the DRM application sends the defect record along with the plain language phrase to a translation tool. The translation tool translates the plain language phrase to DRM taxonomy. The defect record with the DRM taxonomy is sent to an analyst who then analyzes the DRM taxonomy for how a defect record was determined and how the defect record was resolved.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

EXAMPLE 1

By way of a non-limiting example, a user (e.g., a classifier) can use natural language phrases/sentences in a classification tool without predictive text analytics. This allows for an untrained non-expert user of DRM taxonomy to perform defect record classification according to the DRM taxonomy. This requires that the defect record data be exported from defect tracking software to the classification tool.

In this example, a defect record extract is obtained from a defect tracking database. The defect record extract contains at least one defect record but can contain hundreds or even thousands of defect records. Each defect record can contain multiple fields, which include: (i) a unique defect record identifier; (ii) the record open date; (iii) the record close date; (iv) problem description which describes how the defect was discovered and steps to recreate the defect; and (v) resolution description which describes how the defect was resolved.

The defect records are imported into the classification tool. A predefined import procedure adds DRM specific fields to each defect record. These fields can include natural language phrases for DRM activity, DRM trigger, DRM target, DRM artificial type, DRM artifact qualifier, DRM impact, DRM source, DRM content, and DRM age. Additional fields can be added, such as fields associated with work flow management. The workflow management includes processes for apportioning defects to one or more different classifiers. In this example implementation, the classification application has a client/server scheme so that multiple classifiers can access defect records assigned to them for classification at the same time. Accordingly, the classification tool can receive replicated classifications from different classifiers and determine that one or more classifications are replications of other classifications.

The classifier can access an assigned defect record and read the problem description to gain an understanding of the kind of testing or defect removal activity associated with the defect. The classification tool interface allows the classifier to select the natural language phrase that describes the testing or removal activity. Based on this selection, the classification tool, via a user interface, presents a list of natural language phrases that describe the complexity of the activity or the special conditions that had to exist in order for the defect to be revealed (e.g., the system gates subsequent choices). The classification tool interface provides connecting words that can bind phrases into a descriptive sentence.

The classifier next reads the resolution description to understand the resolution that was implemented to satisfy the closure criteria for the defect. The classification tool, via the user interface, allows the classifier to select the natural language phrase that describes the type of resolution. Based on the selection, the classification tool gates (e.g., provides) appropriate lists of natural language phrases that further characterize the resolution that include (i) the scope of the resolution, and (ii) the modality (e.g., adding, removing, correcting, restarting, etc.) of the resolution. Again, the classification tool provides the connecting words that bind phrases into a descriptive sentence.

In this example implementation, real time automated local language translation is enabled such that the classifier and/or an expert classifier can view the user interface in the language of their choice and instant chat can be conducted in each participant's language of choice. When all the defects have been classified and validated by classifier and expert classifier (who may have additional training in comparison to the level of training of a classifier), the classification tool provides workflows for creating tables and graphs of the classified data (e.g., distribution and trend charts) to enable DRM analysis.

EXAMPLE 2

By way of another non-limiting example, a classification application can be used by application development and testing resources in disparate geographic locations. This example includes the use of predictive text analytics and a central computing system.

User interfaces with the central computing system provide for (i) pushing natural language phrase taxonomy updates to classification applications; (ii) pushing gate logic to the classification application; (iii) bidirectional transfer of defect record data; (iv) bidirectional transfer of classifications; (v) enabling predictive text analytics in the classification application; and (vi) enabling collaboration between and among different users by using communication tools such as instant chat and language translation tools between different languages (e.g., from French to English, Spanish to Hindi, etc.).

In using a central computing system, the classification application, via the user interface, provides plain language fields with drop-down choices and logic to gate choices. The central computing system can push updates to the classification application to maintain plain language phrase taxonomy elements in synch with the standardized plain language phrase taxonomy. These updates can include new or revised plain language phrase translations in languages such as English, Hindi, or French.

Further, predictive text analysis is enabled by communicating with the central computing system upon certain events. These events can include adding a problem description or resolution description to a particular defect record. The predictive text analysis allows users to receive predictive text suggestions while a user is entering narrative text into, for example, a problem description for a defect record. Additionally, the classification application can include added workflow logic that prompts the user to confirm the suggested defect classifications.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method comprising:
 receiving, by at least one computing device, a defect record associated with a defect;
 predicting a recommended plain language phrase or word based on a user input from a user and how many times within a predetermined time period a plain language phrase or word has been previously selected in response to the user input being included in a plain language dictionary;

predicting the recommended plain language phrase or word based on a synonym of the user input from the user and how many times within the predetermined time period the plain language phrase or word has been selected in response to the user input not being included in the plain language dictionary;

providing the recommended plain language phrase or word to classify the defect record;

receiving, by the at least one computing device, the recommended plain language phrase or word to describe a type of testing from the user;

mapping, by the at least one computing device, the recommended plain language phrase or word to a taxonomy; and classifying, by the at least one computing device, how the defect was at least one of detected and resolved using the taxonomy.

2. The method of claim 1, further comprising:
providing information regarding the defect record to the user; and
generating the defect record with the recommended plain language phrase or word based on receiving the recommended plain language phrase or word.

3. The method of claim 1, wherein the defect record includes:
a unique defect record identifier;
a record open date;
a record close date;
a problem description which describes how the defect was discovered and steps to recreate the defect; and
a resolution description which describes a resolution or a disposition.

4. The method of claim 1, wherein fields of the defect record include plain language phrases for an activity, trigger, target, artifact type, artifact qualifier, impact, source, content, and age of the defect record.

5. The method of claim 1, wherein the predicting the recommended plain language phrase or word occurs by providing a drop down menu based on the user input in a portion of a field.

6. The method of claim 5, further comprising determining the recommended plain language phrase or word inputted by the user has been used greater than a threshold amount before using the recommended plain language phrase or word to classify the defect record.

7. The method of claim 1, further comprising sending the defect record with the recommended plain language phrase or word to a translation tool which translates the plain language phrase or word to a defect reduction method (DRM) taxonomy.

8. The method of claim 1, further comprising using connectors to combine the recommended plain language phrase or word with another plain language phrase or word to generate a description of the defect record.

9. The method of claim 1, further comprising distributing different defect records to different users and sharing of defect record classification between the different users in real time.

10. The method of claim 1, wherein the recommended plain language phrase can be provided in any language and mapped to the taxonomy.

11. The method of claim 1, wherein the at least one computing device enables real time categorization of the defect record by using multiple computing devices to access and classify the defect record.

12. The method of claim 1, wherein how the defect is resolved includes a resolution description which defines what is necessary to resolve the defect, wherein the resolution description includes at least one of adding, removing, and correcting elements of a system being tested.

13. The method of claim 1, wherein the plain language dictionary stores words and phrases that are selected by the user to map a particular word or phrase to the defect record.

14. The method of claim 13, wherein the synonym is stored in the plain language dictionary.

15. A computer program product for generating plain language phrases comprising a computer readable hardware storage device having program code stored on the computer readable hardware storage device, the program code comprising:
program code to receive a defect record;
program code to send the defect record to a user;
program code to predict a recommended first plain language phrase or word based on a user input from the user and how many times within a predetermined time period a first plain language phrase or word has been previously selected;
program code to provide the recommended first plain language phrase or word to classify the defect record;
program code to receive the recommended first plain language phrase or word which describes a type of testing associated with how the defect record was discovered;
program code to provide connecting words;
program code to receive a second plain language phrase or word which is binded to another plain language phrase or word using the connecting words to form a single plain language sentence related to how the defect associated with the defect record was resolved;
program code to map the recommended first plain language phrase or word to a taxonomy;
program code to map the second plain language phrase or word to the taxonomy; and
program code to initiate to send the defect record with the taxonomy.

16. The computer program product of claim 15, wherein the computer readable hardware storage device further provides workflow management that creates distribution and trend charts regarding classification of different types of defect records.

17. The computer program product of claim 15, wherein the recommended first plain language phrase or word is any language which is mapped to the taxonomy.

18. The computer program product of claim 15, wherein the computer readable hardware storage device further validates classification choices of the user by sending the classification choices to another user.

19. A system comprising:
a CPU, a computer readable memory and a computer readable storage medium;
program instructions to provide a defect record to a user;
program instructions to predict a recommended plain language phrase or word based on a user input from the user and how many times within a predetermined time period a plain language phrase or word has been previously selected in response to the user input being included in a plain language dictionary;
program instructions to predict the recommended plain language phrase or word based on a synonym of the user input from the user and how many times within the predetermined time period the plain language phrase or word has been selected in response to the user input not being included in the plain language dictionary;

program instructions to provide the recommended plain language phrase or word which describes a type of testing to classify the defect record;

program instructions to generate the defect record with the recommended plain language phrase or word; and program instructions to send the defect record with the recommended plain language phrase or word to a translation tool which generates taxonomy that is used by another user to analyze the defect record;

wherein the program instructions are stored on the computer readable storage medium for execution by the CPU via the computer readable memory.

20. The system of claim 19, wherein the providing the recommended plain language phrase or word includes determining whether the recommended plain language phrase or word has been used greater than a threshold amount based on inputs by previous users; and the system further comprises program instructions to provide collaboration between the user and other users that are classifying other defect records.

* * * * *